United States Patent [19]

DeRisi et al.

[11] Patent Number: 5,407,004
[45] Date of Patent: Apr. 18, 1995

[54] HEAT EXCHANGER AND METHOD OF ASSEMBLY THEREOF

[75] Inventors: Joseph F. DeRisi, Hamden, Conn.; Lonnie E. Winston, Jackson, Miss.; Dudley Harrison, Morton, Miss.; Ken Rawson, Clinton, Miss.

[73] Assignee: The Allen Group Inc., New Haven, Conn.

[21] Appl. No.: 917,849

[22] Filed: Jul. 21, 1992

Related U.S. Application Data

[63] Continuation of Ser. No. 657,422, Feb. 19, 1991, Pat. No. 5,150,520, which is a continuation-in-part of Ser. No. 450,677, Dec. 14, 1989, abandoned.

[51] Int. Cl.6 .................. F28F 9/16; B21D 53/08
[52] U.S. Cl. .................... 165/153; 165/173; 29/890.043; 228/175; 228/183
[58] Field of Search ............ 165/153, 173, 175; 29/890.043, 890.054; 228/173.2, 173.4, 175, 183

[56] References Cited

U.S. PATENT DOCUMENTS

| 858,258 | 6/1907 | Briscoe et al. | |
|---|---|---|---|
| 1,320,652 | 11/1919 | Sonneborn | 29/890.054 |
| 2,488,627 | 11/1949 | Hisey | 165/175 |
| 3,078,551 | 8/1958 | Patriarca et al. | 29/157.4 |
| 3,310,868 | 5/1964 | La Porte et al. | 29/157.3 |
| 4,077,559 | 3/1978 | Watson, Jr. | 228/154 |
| 4,128,235 | 12/1978 | Gersbacher | 269/234 |
| 4,377,024 | 3/1983 | Saperstein | 29/157.3 |
| 4,453,301 | 6/1984 | Mort et al. | 29/157.3 |
| 4,482,415 | 11/1984 | Mort et al. | 156/91 |
| 4,498,220 | 1/1985 | Fiegen et al. | 29/157.3 |
| 4,513,811 | 4/1985 | Lesniak | 165/79 |
| 4,529,034 | 7/1985 | Saperstein | 165/173 |
| 4,570,317 | 2/1986 | Veling et al. | 29/157.3 |
| 4,632,291 | 12/1986 | Rahn et al. | 228/9 |
| 4,659,003 | 4/1987 | Simonetti | 228/8 |
| 4,724,994 | 2/1988 | Flury | 228/56.2 |
| 4,730,669 | 3/1988 | Beasley et al. | 165/173 |
| 4,744,505 | 5/1988 | Calleson | 165/173 |
| 4,858,686 | 8/1989 | Calleson | 165/173 |
| 5,036,913 | 8/1991 | Murphy et al. | 29/890.052 |

FOREIGN PATENT DOCUMENTS

| 1097396 | 7/1955 | France | 15/2 |
|---|---|---|---|
| 2592819 | 7/1987 | France | |

Primary Examiner—John Rivell
Assistant Examiner—L. R. Leo
Attorney, Agent, or Firm—DeLio & Peterson

[57] ABSTRACT

A method of affixing a plurality of tubes having oval ends into a plurality of corresponding oval openings of equal circumference in the header wall of a heat exchanger. The minor diameter of the tube ends is greater than the minor diameter of the header openings and the major diameter of the tube ends is less than the major diameter of the header openings. The tube ends are inserted into corresponding openings in the header wall whereupon the minor diameter of the tube ends is reduced and the major diameter of the tube ends is increased to create a substantially fully contacting fit around the circumference with said header openings. Ends of the tubes are welded to corresponding collar openings in the header wall to form a plurality of tube-to-header joints. Flux is applied to the air-facing side of the tube-to-header joints, and molten solder is applied to the opposite liquid-facing side and flowed into any voids in the welded joints to substantially seal the joints against leakage of liquid. Only those joints having potential liquid leaking voids receive the solder—sound, liquid-tight welded joints are not solder sealed.

34 Claims, 4 Drawing Sheets

HEAT EXCHANGER AND METHOD OF ASSEMBLY THEREOF

BACKGROUND OF THE INVENTION

This application is a continuation of Ser. No. 657,422, filed Feb. 19, 1991, now U.S. Pat. No. 5,150,520, which is a continuation-in-part of Ser. No. 450,677 filed Dec. 14, 1989, now abandoned.

This invention relates to heat exchangers and, more particularly to motor vehicle heat exchangers or radiators and to a method of joining the members thereof.

Users of heat exchangers, particularly those used in automotive and truck engine-cooling radiators, are interested in achieving longer life in units which they purchase. Truck manufacturers are especially seeking a longer life radiator which can withstand the extra stress and abuse in a truck environment for significantly longer mileage.

The joints between the tubes and headers in heat exchangers in general, and automotive type radiators in particular, have received increased scrutiny in the goal to achieve longer service life. Typically, the tube-to-header joint had been a simple tin/lead soldered joint between a thin walled brass tube and a thicker header which has a collared hole to receive the tube. Because of expansion and contraction of the tube during the heating and cooling cycle present in operation, the joints between the tubes and the headers are placed in shear stress. Shock and vibration in the motor vehicle environment add to this stress. In addition, chemical reactions between the coolant and any solder which covers the header surface on its water side can cause corrosion products which can flake off and, clog the radiator tubes, thereby leading to engine overheating.

Welding has been used to bond the tube-to-header joint in order to strengthen this portion of automotive radiators. However, current methods of welding do not provide a completely leak-free welded joint in every instance. To rectify this problem, it has been a practice to apply a coating of solder on the air side of all of the joints to seal any leaks in the weld area between the tube and header. This operation requires the placement of expensive perforated solder foil or other prefabricated forms of solder over the tubes on the radiator core prior to assembly of the header to the core. After welding the tubes to the header collars, the header is then dipped in flux and must be heated extensively to cause the solder foil to melt and form the sealant coating on the air side of the header. During this operation, solder flows through the usually numerous tube-to-header joint leaks and considerable solder appears on the water side of the header. This operation is energy intensive, time consuming, and often causes the header to warp due to the high temperatures in the heating operation. Also, the core must normally still be tested to determine the integrity of the tube-to-header joints. In spite of the air-side solder coating, there may often appear several joints which remain unsealed and leak coolant fluid. These joints must then be repaired, usually by hand methods such as using a torch and wire solder on the air side of the joint.

In order to attempt to achieve leak-free tube-to-header joints, resizing of the radiator core tubes has been performed prior to and/or after attachment of the header. U.S. Pat. Nos. 4,744,505 and 4,858,686 disclose a method of resizing the ends of oval or non-circular header tubes to a circular shape, inserting the ends of the tubes into circular collar openings having a slightly larger diameter, and thereafter expanding the outermost portion of the tube ends to create a tight fit with the collar opening. However, even with such resizing, the subsequent welding of the joints still does not usually produce a leak-free joint and, consequently, solder is used to seal the welds. Furthermore, the many steps involved in resizing are time consuming and require positioning and handling of the heavy and unwieldy core. This adds to the cost of manufacture, and the difficulty of the operations contributes to wide variations in product quality.

Alternative methods of sealing the tube-to-header joints include applying flux to the liquid side of the bonded joint and then applying a coating of solder, for example, by dipping into a bath of molten solder or by the use of wave soldering techniques. These methods result in lower header temperatures and thereby minimize warping and the need for repair. However, the increased amount of solder left on the water side surface of the header creates a potential for the creation of solder corrosion products, also termed "solder bloom".

Bearing in mind the problems and deficiencies of the prior art, it is therefore an object of the present invention to provide an improved tube-to-header joint for use in heat exchangers and, in particular, automotive type radiators.

It is another object of the present invention to provide a heat exchanger in which the tube-to-header heat exchanger joints are substantially leak-free.

It is a further object of the present invention to provide a tube-to-header heat exchanger joint which minimizes the need for post-production testing and repair for leaks.

It is another object of the present invention to provide a method of manufacturing a tube-to-header heat exchanger joint which minimizes complicated, time consuming and unwieldy handling of the heat exchanger.

It is a further object of the present invention to provide a method of manufacturing a tube-to-header heat exchanger joint which avoids resizing of tube ends after the core assembly is fitted to the header.

It is yet another object of the present invention to provide a tube-to-header heat exchanger joint which minimizes the amount of solder in contact with the heat exchanger liquid.

It is a further object of the present invention to provide a solder sealed tube-to-header heat exchanger joint which reduces the total amount of solder used, utilizes less expensive solder, and minimizes the effort needed to apply the solder during the production of the heat exchanger.

It is another object of the present invention to provide a welded solder sealed tube-to-header heat exchanger joint which can be readily manufactured by mass-production techniques and which results in an improved product.

SUMMARY OF THE INVENTION

The above and other objects, which will be apparent to those skilled in the art, are achieved in the present invention which provides a method of affixing a plurality of tubes to a plurality of corresponding openings in the header wall of a heat exchanger in which the wall has an inner, liquid-facing side and an outer, air-facing side. In one aspect of the invention directed to insertion of the tubes into the header openings, the ends of oval tubes are sized such that the minor diameter of the tube ends is greater than the minor diameter of the header openings and the major diameter of the tube ends is less than the major diameter of the header openings, with the circumference of the tube ends and the header openings being substantially equal. The tube ends are inserted into corresponding openings in said header wall whereupon the minor diameter of the tube ends is reduced and the major diameter of the tube ends is increased to create a substantially fully contacting fit around the circumference with said header openings. The tube ends are bonded to corresponding openings in the header wall to form a plurality of welded tube-to-header joints on the heat exchanger.

In another aspect of the invention directed to bonding of the tubes and header openings, the tube ends are welded to corresponding openings in the header wall, such that the tubes extend toward the air-facing side of the wall, to form a plurality of welded tube-to-header joints. In this aspect, non-circular tubes, for example oval shaped, can be utilized and, optionally, the tube ends may be sized into a substantially circular cross-section for insertion into and through corresponding circular collar openings in the header. Flux is then applied to the air-facing side of the tube-to header joints, and thereafter a lead/tin or other solder is applied to the liquid-facing side of the tube-to-header joint to flow the solder into any voids in the welded joints and substantially seal the joints against leakage of liquid. Only those joints having potential liquid leaking voids receive the solder. Sound, liquid-tight welded joints are not solder sealed.

Preferably, the method of sizing the tube ends to an oval configuration is used in conjunction with the aforementioned method of welding and soldering the tube-to-header joint. Also, the openings in the header wall preferably comprise collars drawn or formed from the header wall. Flux may be sprayed onto the air-facing side of the tube-to-header joint and thereafter the molten solder may be applied either by dipping the liquid facing side of the joint into a bath of molten solder or passing it through a molten solder wave. In further aspects, the invention comprises heat exchangers having tube-to-header joints produced according to the aforementioned methods. Following solidification of the solder, the liquid-facing side of the tube-to-header joints should be substantially free of solder to minimize corrosion products inside the heat exchanger during use.

DETAILED DESCRIPTION OF THE INVENTION

Figure 1:
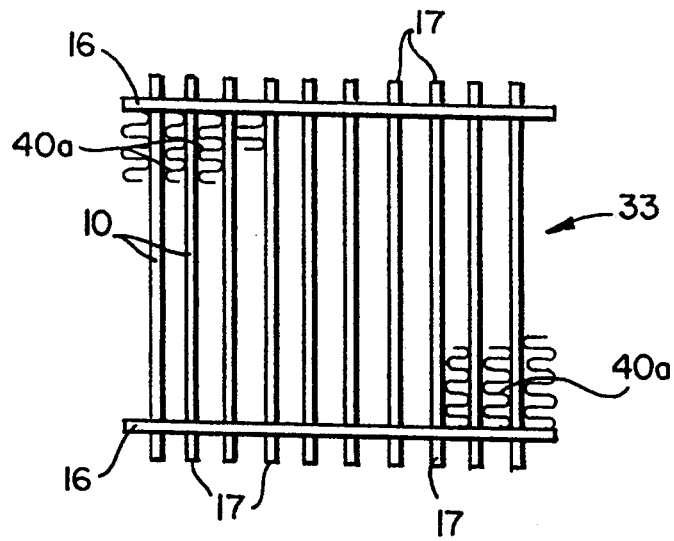
FIG. 1 is a side elevational view of the core assembly of a heat exchanger, made up of the tubes and fins (partially cut away), attached to header plates prior to bonding of the tube-to-header joints in accordance with the method of the present invention.

Reference will be made herein to FIGS. 1 to 10 which detail various portions of the method and article of the present invention. Unless otherwise specified, the materials used to construct the heat exchanger can be any conventional material for such use, such as aluminum, brass or the like. Like numerals refer to like features of the invention throughout the drawings.

Initially, the heat exchanger core components are prepared. These include conventional heat exchanger tubing, for example solder coated brass tubes, and conventional copper heat transfer fins. In the preferred embodiment of the invention, stackable serpentine or similar type fins are employed along with, for example, terne plated core side pieces and solder foil strips for bonding of the core side pieces to the core. Header plates having openings conforming to the size and shape of the tube ends are also prepared. Preferably, the header openings which are to receive the tube ends are prepared by drawing the openings to form a collar extending outward from the header plate.

In accordance with a first aspect of the method of the present invention, there are preferably utilized tubes having oval ends sized in a particular manner in relation to oval openings in the header plate. As used herein, the term "oval" refers to any non-circular shaped axial cross-section (i.e., perpendicular to the axis of the tube) having a generally smoothly curving periphery, such as an ellipse a rectangle with rounded corners, or other obround or egg shape. Being of oval cross-sectional shape, such tubes ends will have a diameter in one direction greater than the diameter in another (usually perpendicular) direction, which are referred to herein as the "major diameter" and "minor diameter" respectively It has been found that use of a special configuration of the oval cross-sectional shapes of both the tube ends and header plate openings requires fewer steps for manufacture and results in improved quality of the welded joints and reduction in the amount of solder required for sealing of the wells. This is accomplished by either sizing or resizing each of the individual core tubes on both ends so that the minor diameter of the outside of the tube ends is greater than the minor diameter of the opening in the header plate and the major diameter of the outside of the tube ends is less than the major diameter of the opening in the header plate. The circumferences of the outside of the tube ends and the opening in the header plate are substantially equal. For the preferred embodiment which employs stackable tube and fin components, such as oval or obround cross section tubes and serpentine type fins, the ends of the core tubes are sized or resized prior to assembly of the core components. This sizing may be accomplished in an automated operation by inserting an appropriately shaped flaring tool to form the oval tube end configuration as described above.

The aforementioned heat exchanger core components are then assembled by stacking the tubes, serpentine or similar type fins, and side plates to form a core block assembly. When the header plate is thereafter pressed onto the core assembly such that the oval tube ends are inserted and fitted into the corresponding header openings, the walls of the tube ends deflect and deform such that the minor diameter decreases while the major diameter increases to meet the same dimensions as the header plate opening, thereby creating a fully contacting tight fit in the tube-to-header joint. The selection of tube and collar dimensions is made to provide this fully contacting tight fit with a minimum of force required to press the header onto and over the tube ends.

After the header plate is attached over the tube ends of the core assembly, the core is then baked with the headers in place, eliminating the need for false header fixtures. This baking results in soldering of the core components. After baking, the core is ready for tube-to-header joint welding with no further resizing or flaring of the tube ends. The resulting welds are of generally uniform high quality because of the good tube-to-header fit. Other methods of bonding the tubes to the header openings may also be used, for example, by soldering. However, the preferred method of bonding the tube-to-header joints is by welding and soldering as described further below.

Instead of using the serpentine or similar stackable type fins, conventional plate type fins may be used in assembling the heat exchanger core block. With such fins, the tubes are inserted through tube openings in the plate type fins, rather than being stacked together with the tubes during assembly as with the serpentine type fins. The assembled tube and plate type fin core block is then baked without the header plates to bond the components. Because flaring of the tube ends would interfere with insertion into the openings in the plate fins, the tube ends should be sized to their oval configuration as described above only after the assembly with the fins and, preferrably, after the baking process. Following baking, the header plates are then fitted over the tube ends and bonded thereto. The use of serpentine or similar type stackable fins is preferred since the oval tube ends may be more easily sized prior to assembly of the core block, with the result that the more costly step of sizing the core ends after assembly and baking is eliminated.

FIGS. 1–5 depict the preferred method of assembling the heat exchanger prior to bonding of the tube-to-header joints. Referring to FIG. 1, there is shown the assembled basic components of the heat exchanger 33 fitted together prior to the initial baking operation. Tubes 10 are arrayed in a typical parallel configuration and serpentine fins 40a (shown only partially over the tubes for illustration purposes) are fitted to the tubes to create a stacked, unbonded core assembly. To assist in holding the core assembly in place during the baking cycle and to maintain alignment of the core tubes, header plates 16 having collared header openings 17 are fitted to the core assembly by inserting the tube ends into the collared openings.

Figure 2:
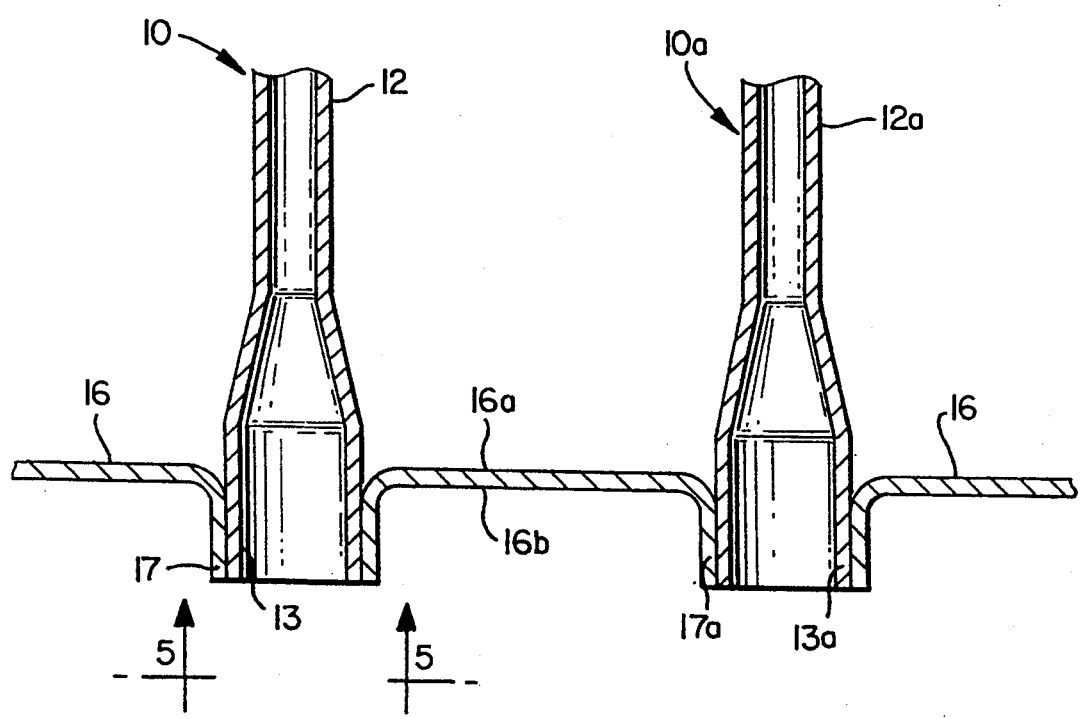
FIG. 2 is a close up cross-sectional view of a pair of tubes inserted into openings in the header wall of the heat exchanger depicted in FIG. 1.

The unbonded tube-to-header joint is shown in more detail in FIG. 2 which depicts a pair of tubes 10 and 10a as fitted into collared openings 17, 17a of header plate 16. The tubes 10 and 10a have oval tube bodies 12, 12a with flared oval tube ends 13, 13a, respectively. The collar openings 17, 17a extend from the water-facing side 16b in a direction opposite the air-facing side 16a of header plate 16. The tube ends 13, 13a are fitted into the respective collar opening 17, 17a so that the ends of the tubes and collars are essentially coplanar and the tube bodies extend from the air-facing side 16a of the header plate.

Figure 3A:
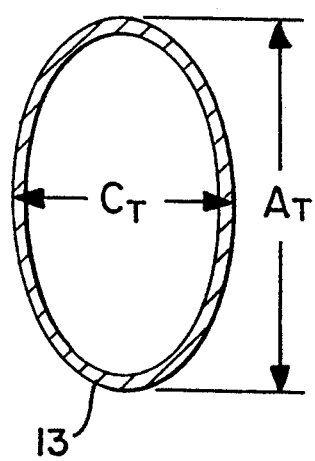
FIG. 3a is an axial cross-sectional view of an undeflected oval tube end, perpendicular to the axis of the tube, as it is sized prior to insertion into the header plate.
Figure 3B:
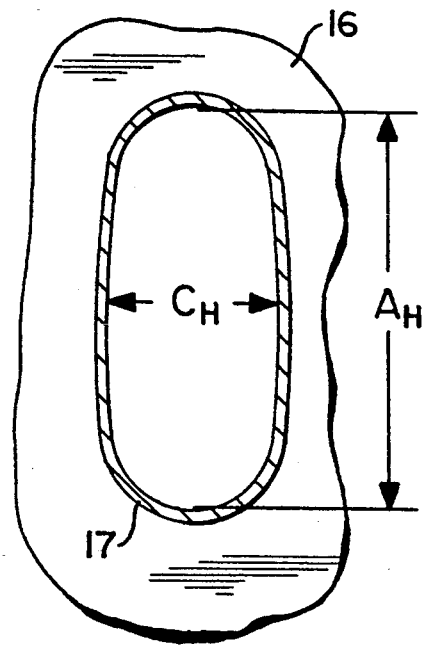
FIG. 3b is an axial cross-sectional view of an oval shaped, collared header opening prior to insertion of a tube.

An axial cross-sectional view of flared oval tube end 13, transverse or perpendicular to the tube axis prior to insertion in the header, is depicted in FIG. 3a. The major diameter of tube end 13 is shown as $A_T$ and the minor diameter is shown as $C_T$. Both the major and minor diameters are measured at the outside or exterior of the tube periphery. The sizing of tube end 13 in accordance with the method of the present invention results in the tube end major diameter $A_T$ being somewhat smaller than the major diameter of the oval tube body 12 and the tube end minor diameter $C_T$ being somewhat greater than the minor diameter of tube body 12. FIG. 3b depicts a cross-sectional view of header plate collar opening 17 wherein $A_H$ is the major diameter and $C_H$ is the minor diameter. Both the major and minor diameters are measured at the inner periphery of collar 17.

Figure 4:
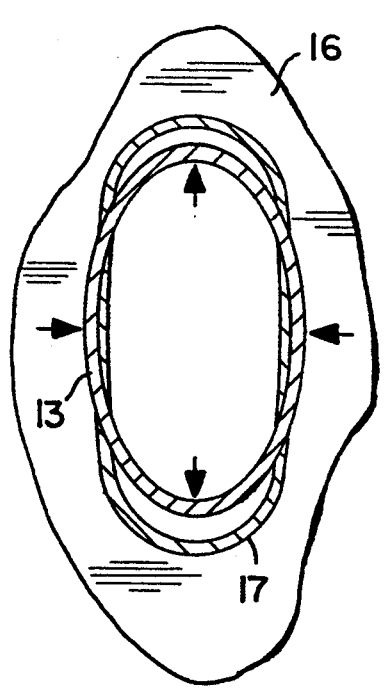
FIG. 4 is an axial view of the cross-sectional view of the tube end of FIG. 3a superimposed upon and over the cross-sectional view of the collared header plate opening of FIG. 3b.

FIG. 4 depicts the undeformed tube end 13 as shown in FIG. 3a superimposed over the collar opening depicted in FIG. 3b to illustrate that the minor diameter of tube 13 is greater than the minor diameter of collar opening 17 while the major diameter of tube 13 is smaller than the major diameter of collar 17. The arrows indicate the direction of deflection of the tube walls upon insertion into the header opening.

Figure 5:
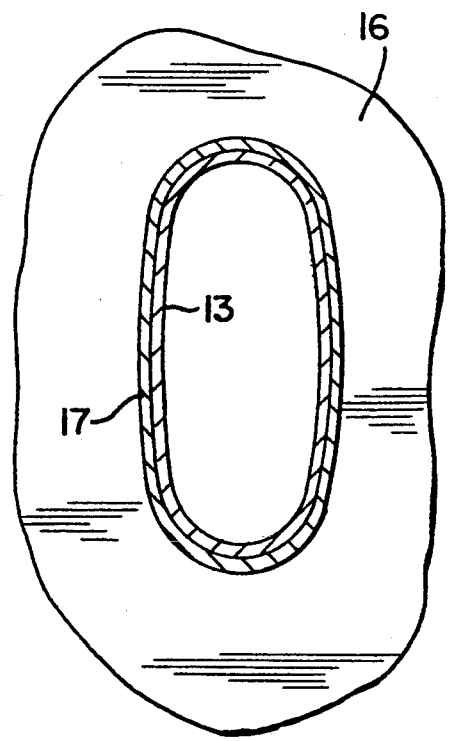
FIG. 5 is an axial cross-sectional view of the tube end of FIG. 3a after insertion into the header plate opening of FIG. 3b.

The insertion of the tube end 13 into collar opening 17 is depicted in FIG. 5 to show the deformation of the tube end so that its major and minor diameters correspond to those of the collar. Because the circumference of the outer periphery of tube end 13 is substantially equal to the circumference of the inner periphery of collar opening 17, there is a close fit between the two which reduces the likelihood of void formation during subsequent bonding of the tube-to-header joint. Actual tube end and collar diameters may be selected to require a minimum of insertion force.

Figure 6:
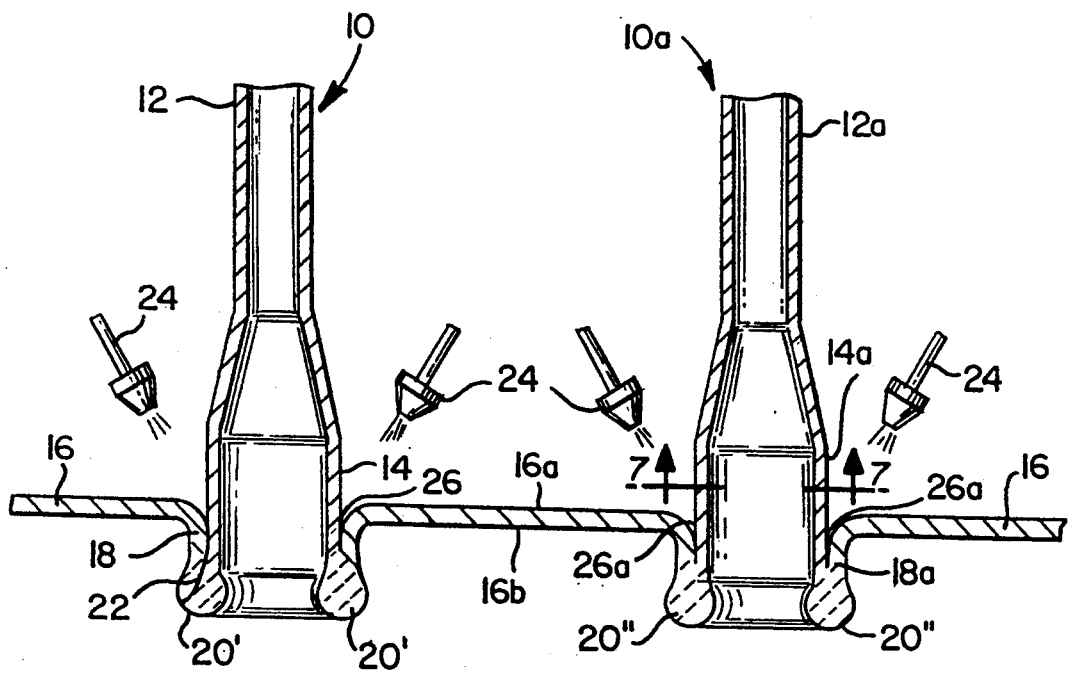
FIG. 6 is a side elevational view of the cross-section of a pair of tube-to-header joints on a heat exchanger header wall during the application of flux in accordance with the method of the present invention.
Figure 7:
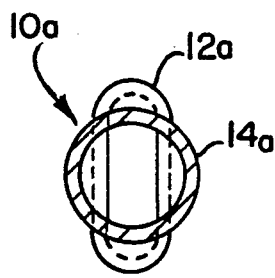
FIG. 7 is an axial cross-sectional view of the end of a heat exchanger tube depicted in FIG. 6.
Figure 8:
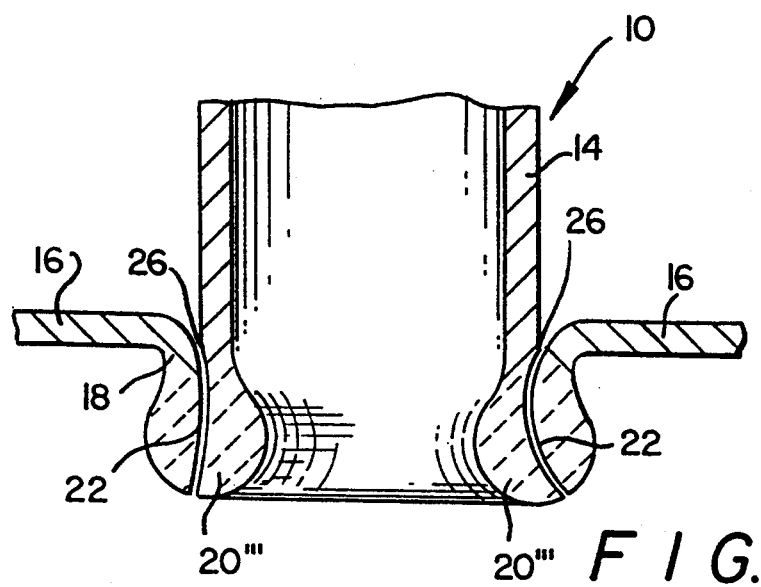
FIG. 8 is a side elevational close up view of a cross-section of a welded tube-to-header joint having weld voids.

FIGS. 6–10 depict the preferred method of bonding tube-to-header joints, and in FIG. 6 there is shown a portion of the heat exchanger made in accordance with this aspect of the method of the present invention. Heat exchanger tubes 10 are provided to carry the working fluid of the heat exchanger to any fins (not shown) and between opposed headers, a wall of which is shown as 16. As seen in FIG. 7 in an axial cross-section transverse to its longitudinal axis, the main body portion of tube 10a has a generally oval shape 12a, the end portions 14A of which have been shaped into a substantially circular cross-section. Optionally, the tube body portions may have other cross sectional shapes. Preferably, tubes having oval ends sized in accordance with the previously described method are fitted into appropriately sized oval header openings, and may be welded and soldered in accordance with the same principles used in connection with the circular ended tubes depicted in FIGS. 6-10.

The header wall or plate 16 shown is oriented with the air-facing side 16a facing upward and the liquid-facing side 16b facing downward, as seen in FIG. 1. Header wall 16 includes a series of openings in the form of integral drawn collars or flanges 18 substantially conforming to the shape of tube end portions 14. As shown in FIG. 6, circular tube end portions 14 are received within and extending through circular collar openings 18 formed in wall 16. The tube body portions extend away and outward from the joint on the air side of the header wall. Where the tube ends are not of oval configuration and sized in accordance with the methods described previously, they may be optionally sized after insertion into the collar opening to provide a tight compression type fit between the tube end and the collar opening, for example, by the method taught in U.S. Pat. Nos. 4,744,505 and 4,858,686, the disclosures of which are herein incorporated by reference, wherein the tube ends are substantially coplanar with the ends of collar 18 and the outermost tube end portion is expanded to form a tight fit with the lip of the collar.

Following the tube insertion step, the tube ends are bonded to the header wall collar openings 18 by welding. This process may be performed by any known method, for example, by those disclosed in the aforementioned U.S. Patents or those methods disclosed in U.S. Pat. Nos. 4,377,024 and 4,529,034, the disclosures of which are also incorporated by reference. The finished welded tube-to-header joints are shown as weld beads 20' and 20''.

In the course of producing a welded or otherwise bonded tube-to-header joint, voids may be present which present the possibility of liquid leakage from the liquid side of the header through the joint to the air side of the header. Typical voids 22 are shown in welded joint 20''' in the close-up of FIG. 8 wherein the void 22 comprises a narrow opening between the liquid and air sides of header wall 16. Void 22 is shown as a channel-like opening here only for purposes of convenience—such voids may be of numerous other shapes such as gas pockets formed in a weld bead, cracks formed upon heating or cooling of the weld bead, or areas in which the welding or bonding has been incompletely made. The term "void" is intended to cover these and other potential liquid-leaking openings in the joint. In any event, such voids 22 may or may not be present in every joint, as shown in FIG. 6 wherein void 22 is present in a first welded joint 20', but absent from a second welded joint 20''. It is common that at least a portion of, but not all, of the welded joints in a motor vehicle type radiator may contain such voids. The present invention is directed to a method which results in a completed heat exchanger in which only those welded joints having voids are sealed by solder, and those welded joints in which there are no leak causing voids are not sealed by any solder.

Referring back to FIG. 6, following the welding of the tube ends to the header wall, the heat exchanger is preferably positioned on its end so that the tube-to-header joints face downward, i.e., the header wall 16 is usually horizontal and the tube bodies extend upward and vertically from the tube-to-header joints. A solder flux type material is shown being sprayed by nozzles 24 into the upward air side 26 of each tube-to-header joint. These fluxes may be any type conventionally used in soldering which are capable of being applied in the manner contemplated by this invention. Each joint in a given heat exchanger is sprayed with flux in this manner so that in those joints having voids which present the potential for liquid leakage, the flux may thoroughly coat the area and flow downward into the void itself either by gravity or capillary action, or both. The heat exchanger may also be tilted slightly during flux application to allow any excess flux to run off without coating the water-facing side of the header. The usually limited size of the voids which may be present in any of the tube-to-header joints also prevents excessive amounts of the flux from running through or around to the water-facing side of the header plate.

Figure 9:
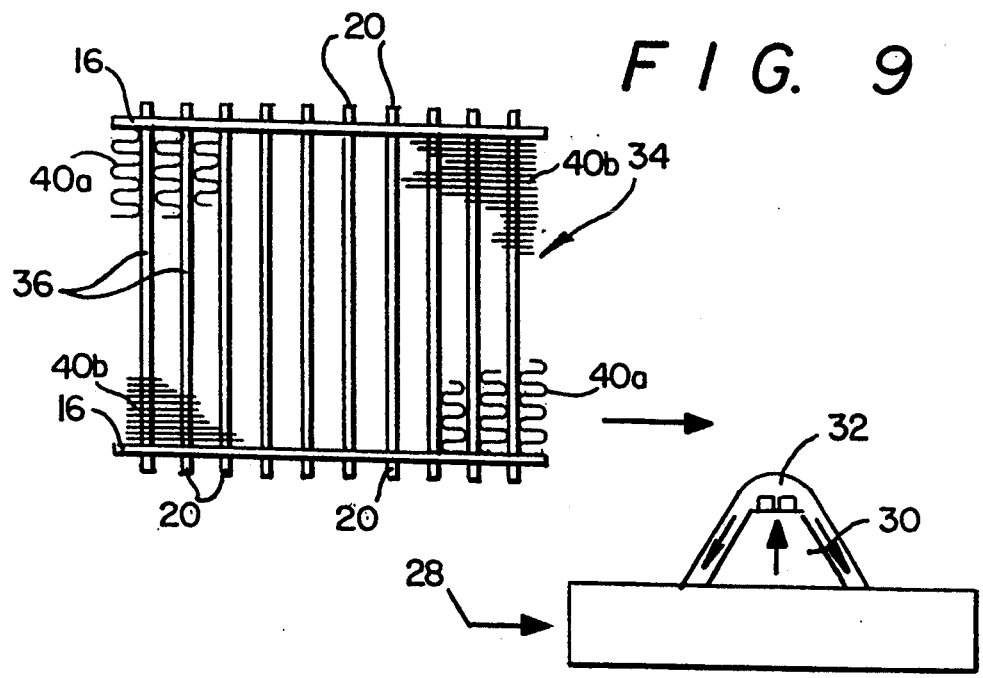
FIG. 9 is a side elevational view showing a heat exchanger (illustrating two different types of fins partially cut away) during the solder application step in accordance with the method of the present invention.

Subsequently, as illustrated in FIG. 9, the welded and fluxed tube-to-header joints of the heat exchanger are subjected to a soldering operation by contacting the liquid facing side of the tube-to-header joint with solder, for example, by dipping into molten solder. The preferred method utilizes a solder wave device 28 which employs a solder pump 30 to form an upward directed molten solder wave 32. The header tube assembly 34 is shown on its end to present the downward facing joints 20 to the molten solder. For illustration purposes, both serpentine type heat exchanger fins 40a and plate type heat exchanger fins 40b are shown partially on heat exchanger tube array 36. Normally, only one type of fin is employed in the heat exchanger.

During the soldering process, header tube assembly 34 is moved to the right, as shown by the arrow in FIG. 9, to present the downward facing joints for contact with the molten solder wave 32. The ends of the tube-to-header joints 20 are immersed in the molten solder only to a degree sufficient to draw the solder up, by capillary action, through any voids present in those joints. A solder fillet may be formed on the air side of any such joints. As practiced by the present invention, the joints are not exposed to any more heat than is necessary to apply the molten solder in this fashion. Furthermore, because of the application method, the solder employed may be of the relatively inexpensive type used in such molten solder application devices, and need not be the more expensive foil or wire type solder utilized in the prior art. Joints which have no voids or cracks do not draw up any solder and, consequently, no solder fillets are formed on either the air or water side of any sound joints. Following solidification, the only solder which remains on the water side of the header is that which actually seals the voids in those tube-to-header joints that have them. There is essentially no surface coverage by solder on the water side of the header wall because fluxing is limited to the voids only, and therefore the water side of the header wall (aside from the voids themselves) remains substantially solder free to prevent excessive solder bloom corrosion.

Figure 10:
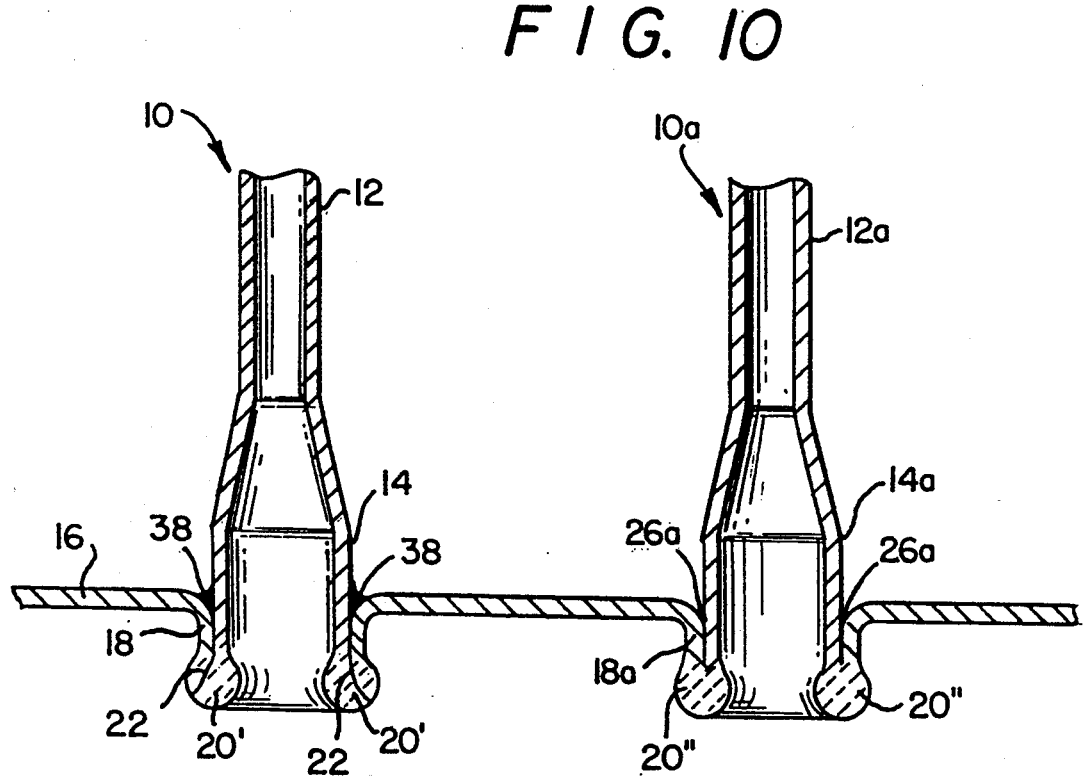
FIG. 10 is a cross-sectional view of tube-to-header joints produced in accordance with the method of the present invention.

Typical completed tube-to-header joints made in accordance with the present invention are illustrated in FIG. 10 which shows a pair of tubes 10 and 10a joined to header wall 16. Tube 10 on the left is secured to the header wall by welded joint 20' which initially included a pair of voids 22 through the joint from the liquid to the air side. As a result of the fluxing and soldering operation of the present invention, voids 22 have been sealed by solder which has been drawn up through the voids by capillary action to seal not only void 22 but also provide a fillet type seal 38 on the air facing side of the joint. Because the flux was initially applied to the air-facing side of this joint, essentially no solder remains on the liquid side of joint 20'. The other tube 10a is shown as having been initially sealed to header wall 16 by a sound welded joint 20" which contained no voids which would provide potential points of leakage. Although the welded joint 20" also had flux applied on its air side and contacted with molten solder on its liquid side during the soldering operation, the soundness of the joint prevented any flux from passing through to the liquid side. Thus, joint 20" is substantially free of solder on both its air side and liquid side.

Following the solder application step of the present invention, the manufacture of the heat exchanger may be continued and completed by bonding the header tanks onto the respective header walls by any conventional methods such as those described in the aforementioned U.S. Patents.

The method of resizing the oval tube ends described herein significantly reduces the handling of the heat exchanger during the manufacturing process compared to prior methods, particularly those which require resizing of the tube ends after assembly and baking of the core and again after fitting to the header. Additionally, the resizing results in a proper, tight fit between the tube end and header for subsequent bonding. This reduces the cost of manufacturing and variability in product quality.

The method of applying the flux and solder sealing of welding joints according to the present invention results in a welded radiator product which has less solder on the water side of the header than prior art methods. Furthermore, the mass-produced heat exchanger which results from this method is unique in that solder appears on the water side of the header only where void sealing is required, and solder appears on the air side of the header as a fillet around only those tube-to-header joints which require the sealing of a void. Thus the present invention results in welded tube-to-header joints with greatly increased strength over soldered joints with the advantage of minimizing the amount of solder in contact with the coolant and effectively eliminating the undesirable effects of solder bloom corrosion. The actual amount of solder coating is limited to the location of actual leaks and is only a fraction of the amount of solder employed in a solder dipped header. This amount of solder is considerably less than the amount created on prior art welded headers when sealing solder is applied to the air side and flows through the leaking welded joints to the water side of the header.

Furthermore, the cost of the solder sealing used in this invention is considerably less than the cost of prior art air-side soldering by the use of perforated foil or other specialty solder products because less solder is used, the solder is purchased in inexpensive form and no added shaping or perforation operation is required, and the energy required to melt the solder for dipping and in particular for wave soldering is less than that to melt the solder foil or other specialty solder product for air-side solder sealing.

Additionally, water side solder sealing according to the present invention is found to be almost completely effective in sealing sample cores, thereby eliminating the need for rework of the air side solder which is usually required by hand performed torch and wire solder operations. Typically, five to ten joints in every motor vehicle radiator core may require rework when utilizing prior art methods. The present invention which utilizes air side flux application and water side solder sealing reduces leaks to a level which provide the possibility of eliminating individual leak testing of the radiators. Furthermore, the appearance of the welded cores wherein the solder is limited only to the leaks on each collar is much more uniform and attractive than a core which has been sealed on the air side and on which the solder has run through to the water side on many of the joints.

When utilized in the method of the present invention, wave soldering is significantly faster than the prior art air side soldering techniques and reduces production costs along with the labor and other expense of placing perforated solder foil on the heat exchanger.

While the invention has been described with reference to specific embodiments, it will be recognized by those skilled in the art that variations are possible without departing from the spirit and scope of the invention, and that it is intended to cover all changes and modifications of the invention disclosed herein for the purposes of illustration which do not constitute departure from the spirit and scope of the invention.

Having thus described the invention, what is claimed is:

1. A method of securing and sealing a plurality of tubes having oval ends to a plurality of oval openings in the wall of a header in a heat exchanger wherein the wall has an inner, liquid-facing side and an outer, air-facing side comprising the steps of:
   (a) sizing the oval ends of said tubes or said header openings such that the minor diameter of the tube ends is greater than the minor diameter of the header openings and the major diameter of the tube ends is less than the major diameter of the header openings, the circumference of said tube ends and said header openings being substantially equal;
   (b) inserting said tube ends into corresponding openings in said header wall, such that said tubes extend outward from the air-facing side of said wall, whereupon the minor diameter of said tube ends is reduced and the major diameter of said tube ends is increased to create a substantially fully contacting fit around the circumference with said header openings;
   (c) welding said tube ends to corresponding openings in said header wall to form a plurality of welded tube-to-header joints;
   (d) applying flux to the air-facing side of said tube-to-header joints; and
   (e) applying solder to the liquid-facing side of said tube-to-header joints and flowing said solder into any voids in said welded joints to substantially seal said voids against leakage of liquid.

2. The method of claim 1 wherein, prior to step (b), the tubes are assembled in an array and heat exchanger fins are fitted thereto to form a heat exchanger core.

3. The method of claim 1 wherein said openings in said header wall comprise collars formed from the header wall prior to step (b).

4. The method of claim 1 wherein, prior to step (b), the tubes are assembled in an array and heat exchanger fins are fitted thereto to form a heat exchanger core, and between steps (b) and (c), the heat exchanger core and header are baked to bond the tubes to the fins.

5. The method of claim 1 wherein the flux is applied in step (d) by spraying onto the air-facing side of said tube-to-header joints.

6. The method of claim 1 wherein the solder is applied in step (e) by dipping the liquid-facing side of the tube-to-header joint into molten solder.

7. The method of claim 1 wherein the solder is applied in step (e) by passing the liquid-facing side of the tube-to-header joint through a molten solder wave.

8. The method of claim 1 wherein at least one of said welded tube-to-header joints contains a leak-causing void following step (c), and wherein said leak-causing void is sealed during step (e).

9. The method of claim 1 wherein, following step (e), said tube-to-header joints are substantially free of solder on their liquid-facing side.

10. The method of claim 1 wherein said tube-to-header joints are positioned with the welded joints facing downward during flux application step (d).

11. The method of claim 1 wherein said tube-to-header joints are positioned with the welded joints facing downward during solder application step (e).

12. A method of producing tube-to-header joints in a heat exchanger wherein the header includes a wall having a first liquid-facing side and an opposite, second, air-facing side comprising:
   (a) sizing ends of oval tubes or oval header openings such that the minor diameter of the tube ends is greater than the minor diameter of oval openings in the header wall and the major diameter of the tube ends is less than the major diameter of the oval header wall openings, the circumference of said tube ends and said header openings being substantially equal;
   (b) inserting said tube ends into corresponding openings in said header wall, such that said tubes extend outward from second side of said wall, whereupon the minor diameter of said tube ends is reduced and the major diameter of said tube ends is increased to create a substantially fully contacting fit around the circumference with said header openings;
   (c) welding said tube end portions to said header wall collar openings to form a plurality of tube-to-header joints whereby at least one, but not all, of said joints contains a void through which a working fluid for said heat exchanger may leak;
   (d) applying solder flux to only the portion of said joint on said second side of said wall such that said flux flows into said voids; and
   (e) applying liquid solder to only the portion of said joint on said first side of said wall such that said solder flows into said voids; and
   (f) solidifying said solder to seal said void-containing joints against leakage of said working fluid whereby the surface of said joint on said first side of said header wall is otherwise substantially free of solder.

13. The method of claim 12 wherein said solder applying step (e) is by dipping said joint into molten solder.

14. The method of claim 13 wherein said solder applying step (e) is by passing said joint through a molten solder wave.

15. The method of claim 14 wherein said flux applying step (d) is by spraying.

16. A method of securing and sealing a plurality of tubes to a plurality of corresponding openings in the wall of a header in a heat exchanger wherein the wall has an inner, liquid-facing side and an outer, air-facing side comprising the steps of:
   (a) welding ends of said tubes to corresponding openings in said header wall, such that said tubes extend outward from the air-facing side of said wall, to form a plurality of welded tube-to-header joints;
   (b) applying flux to the air-facing side of said tube-to-header joints so that essentially no flux is present on the liquid-facing side of said joints except at any voids in said welded joints; and
   (c) applying solder to the liquid-facing side of said tube-to-header joint and flowing said solder into any voids in said welded joints to substantially seal said voids against leakage of liquid.

17. The method of claim 16 wherein said openings in said header wall comprise collars formed from the header wall prior to step (a).

18. The method of claim 17 wherein the ends of said tubes are inserted into and extend through the collar openings prior to step (a).

19. The method of claim 16 wherein the flux is applied in step (b) by spraying onto the air-facing side of said tube-to-header joints.

20. The method of claim 16 wherein the solder is applied in step (c) by dipping the liquid-facing side of the tube-to-header joint into molten solder.

21. The method of claim 16 wherein the solder is applied in step (c) by passing the liquid-facing side of the tube-to-header joint through a molten solder wave.

22. The method of claim 16 wherein at least one of said welded tube-to-header joints contains a leak-causing void following step (a), and wherein said leak-causing void is sealed during step (c).

23. The method of claim 16 wherein, following step (c), said tube-to-header joints are substantially free of solder on their liquid-facing side.

24. The method of claim 16 wherein said tubes are non-circular in cross-section and said openings are circular, and including the step of shaping the ends of said tubes into a substantially circular cross-section prior to step (a).

25. The method of claim 16 wherein said tube-to-header joints are positioned with the welded joints facing downward during flux application step (b).

26. The method of claim 16 wherein said tube-to-header joints are positioned with the welded joints facing downward during solder application step (c).

27. A method of producing tube-to-header joints in a heat exchanger comprising:
   (a) preparing a header wall having a plurality of tube-receiving collar openings, said collar openings extending outward from a first side of said wall;
   (b) preparing a plurality of tubes having end portions shaped to conform to said collar openings;
   (c) fitting said tube end portions into said collar openings such that said tubes extend outward from a second side of said wall opposite said first side;
   (d) welding said tube end portions to said collar openings to form a plurality of tube-to-header joints whereby at least one, but not all, of said joints contains a void through which a working fluid for said heat exchanger may leak;
   (e) applying solder flux to only the portion of said joint on said second side of said wall and flowing said flux into said voids so that essentially no flux is present on the first side of said joints except at any voids in said welded joints;
   (f) applying liquid solder to only the portion of said joint on said first side of said wall such that said solder flows into said voids; and (g) solidifying said solder to seal said void-containing joints against leakage of said working fluid whereby the surface of said joint on said first side of said header wall is otherwise substantially free of solder.

28. The method of claim 27 wherein said solder applying step (f) is by dipping said joint into molten solder.

29. The method of claim 28 wherein said flux applying step (e) is by spraying.

30. The method of claim 27 wherein said solder applying step (f) is by passing said joint through a molten solder wave.

31. A heat exchanger having a plurality of tubes joined to a plurality of corresponding openings in the wall of a header wherein the wall has an inner, liquid-facing side and an outer, air-facing side to form a plurality of tube-to-header welded joints, at least some but not all of said joints having potentially leak-causing weld voids therein, said weld voids being filled with a solder sealant such that, except for the void locations themselves, the liquid sides of all of said tube-to-header joints are substantially free of solder, and the air sides of the void-free joints are free of solder.

32. The heat exchanger of claim 31 further including solder sealant on the air sides of only the void-containing joints.

33. A method of securing and sealing a plurality of tubes to a plurality of corresponding openings in the wall of a header in a heat exchanger wherein the wall has an inner, liquid-facing side and an outer, air-facing side, wherein ends of said tubes and said header openings are oval in shape and wherein the undeformed minor diameter of the tube ends is greater than the minor diameter of the header openings and the undeformed major diameter of the tube ends is less than the major diameter of the header openings, the circumference of said tube ends and said header openings being substantially equal, comprising the steps of:

(a) welding said tube ends to corresponding openings in said header wall, such that said tubes extend outward from the air-facing side of said wall, to form a plurality of welded tube-to-header joints;

(b) applying flux to the air-facing side of said tube-to-header joints so that essentially no flux is present on the liquid-facing side of said joints except at any voids in said welded joints; and (c) applying solder to the liquid-facing side of said tube-to-header joints and flowing said solder into any voids in said welded joints to substantially seal said voids against leakage of liquid.

34. A method of producing tube-to-header joints in a heat exchanger comprising:

(a) preparing a header wall having a plurality of tube-receiving collar openings, said collar openings extending outward from a first, liquid-facing side of said wall;

(b) preparing a plurality of tubes having end portions shaped to conform to said collar openings;

(c) fitting said tube end portions into said collar openings such that said tubes extend outward from a second, air-facing side of said wall opposite said first, liquid-facing side;

(d) welding said tube end portions to said collar openings to form a plurality of tube-to-header joints whereby at least one, but not all, of said joints contains a void through which a working fluid for said heater exchanger may leak;

(e) applying solder flux to only the portion of said joints on said air-facing side of said wall and flowing said flux into said voids so that essentially no flux is present on the liquid-facing side of said joints except at any voids in said welded joints;

(f) applying liquid solder to only the portion of said joints on said liquid-facing side of said wall such that said solder flows into said voids; and (g) solidifying said solder to seal any void-containing joints against leakage of said working fluid whereby: i) in any welded joint containing a void the liquid-facing side is substantially free of solder except that which actually seals the void, and ii) in any welded joint not containing a void, both the liquid-facing and air-facing sides are substantially free of solder.

* * * * *

UNITED STATES PATENT AND TRADEMARK OFFICE
CERTIFICATE OF CORRECTION

PATENT NO. : 5,407,004
DATED : April 18, 1995
INVENTOR(S) : DeRisi et al.

It is certified that error appears in the above-identified patent and that said Letters Patent is hereby corrected as shown below:

Item [57]
In the Abstract line 16, delete, "Joints" should read —joints—.

In column 1, line 34, after "and", please delete - -,- -.

In column 4, line 58, after "tively", please insert - -.- -.

In column 6, line 63, please delete "14A" and insert - -14a- -.

Signed and Sealed this

Twenty-seventh Day of June, 1995

Attest:

BRUCE LEHMAN

*Attesting Officer*     *Commissioner of Patents and Trademarks*